United States Patent [19]
Nickerson

[11] Patent Number: 5,226,177
[45] Date of Patent: Jul. 6, 1993

[54] REAL-TIME WIRELESS AUDIENCE RESPONSE SYSTEM

[75] Inventor: Rand B. Nickerson, Scarborough, Canada

[73] Assignee: Viewfacts, Inc., Chicago, Ill.

[21] Appl. No.: 925,236

[22] Filed: Aug. 3, 1992

Related U.S. Application Data

[63] Continuation of Ser. No. 697,526, Apr. 29, 1991, abandoned, which is a continuation of Ser. No. 500,144, Mar. 27, 1990, abandoned.

[51] Int. Cl.⁵ .......................................... H04B 17/00
[52] U.S. Cl. ................................. 455/2; 340/825.54; 358/84; 455/54.1
[58] Field of Search ............... 455/2, 4.1, 4.2, 5.7, 455/6.3, 32.1, 53.1, 54.1, 54.2, 70; 358/84, 86; 340/825.54, 825.55; 379/53, 92; 434/350, 351

[56] References Cited

U.S. PATENT DOCUMENTS

| | | | |
|---|---|---|---|
| 3,328,803 | 6/1967 | Schwerin | 346/49 |
| 3,513,443 | 5/1970 | Andersen | 455/603 |
| 3,744,712 | 7/1973 | Papadopoulos et al. | 235/52 |
| 3,943,641 | 3/1976 | Dworetzky | 434/350 |
| 4,107,734 | 8/1978 | Percy et al. | 358/84 |
| 4,218,737 | 8/1980 | Buscher et al. | |
| 4,229,829 | 10/1980 | Grunwald | 455/600 |
| 4,290,141 | 9/1981 | Anderson et al. | 455/2 |
| 4,308,554 | 12/1981 | Percy et al. | 358/84 |
| 4,377,870 | 3/1983 | Anderson et al. | 455/2 |
| 4,454,700 | 5/1984 | Kempner et al. | 179/2 AS |
| 4,455,570 | 6/1984 | Saeki et al. | |
| 4,478,121 | 10/1984 | Yashiro | 358/84 |
| 4,591,906 | 5/1986 | Morales-Garza et al. | 455/2 |
| 4,644,509 | 2/1987 | Kiewit et al. | 367/87 |
| 4,646,145 | 2/1987 | Percy et al. | 358/84 |
| 4,689,619 | 8/1987 | O'Brien, Jr. | 340/825.08 |
| 4,764,120 | 8/1988 | Griffin et al. | 434/350 |
| 4,866,524 | 9/1989 | Six | 358/183 |
| 4,926,255 | 5/1990 | Von Kohorn | 358/84 |
| 4,930,011 | 5/1990 | Kiewit | 358/84 |
| 5,034,807 | 7/1991 | Von Kohorn | 358/84 |

*Primary Examiner*—Reinhard J. Eisenzopf
*Assistant Examiner*—Chi H. Pham
*Attorney, Agent, or Firm*—Faegre & Benson

[57] ABSTRACT

A system for collecting data from a plurality of respondents having a central portion with a central processor and a base station and a remote portion with a plurality of wireless response units for respondents to be prompted to enter response data to a visually perceptible display which may be shown live, on a television monitor or may be taped. The display may include multiple choice questions. The central processor accumulates the response data via radio, optical or acoustic communication links with the remote units, each of which has a unique address. The central processor displays the accumulated response data in real time and may overlay the processed response data and originate display shown to the respondents.

47 Claims, 12 Drawing Sheets

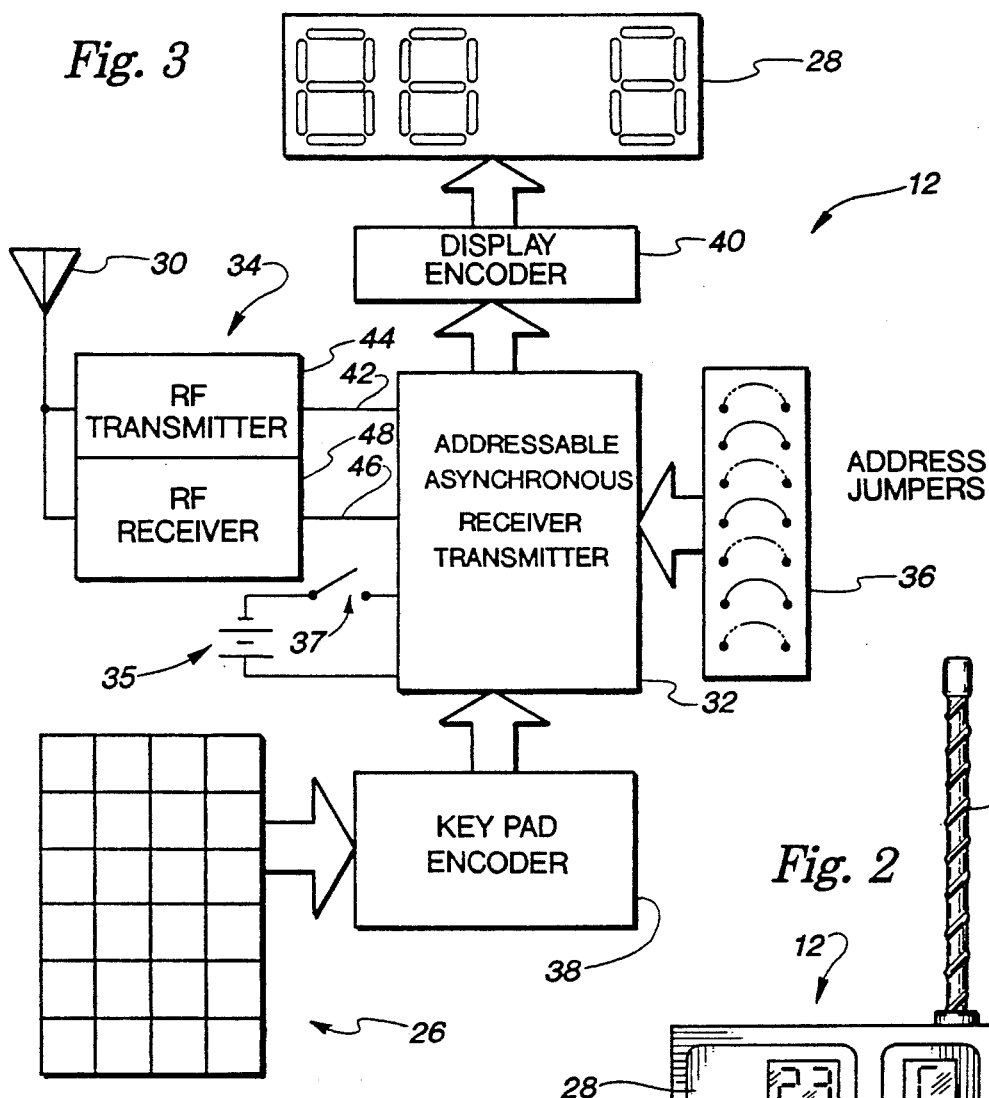
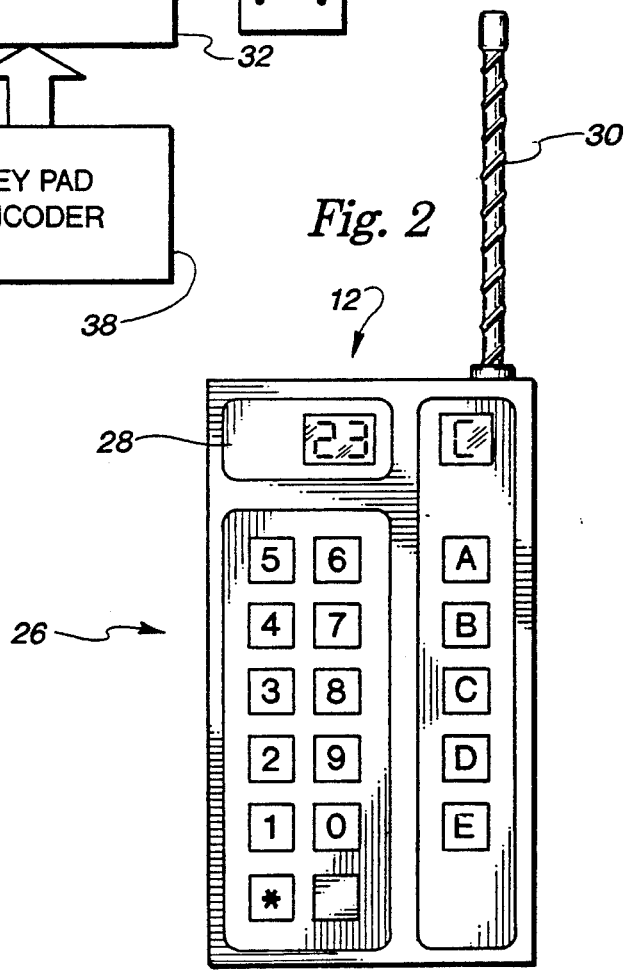

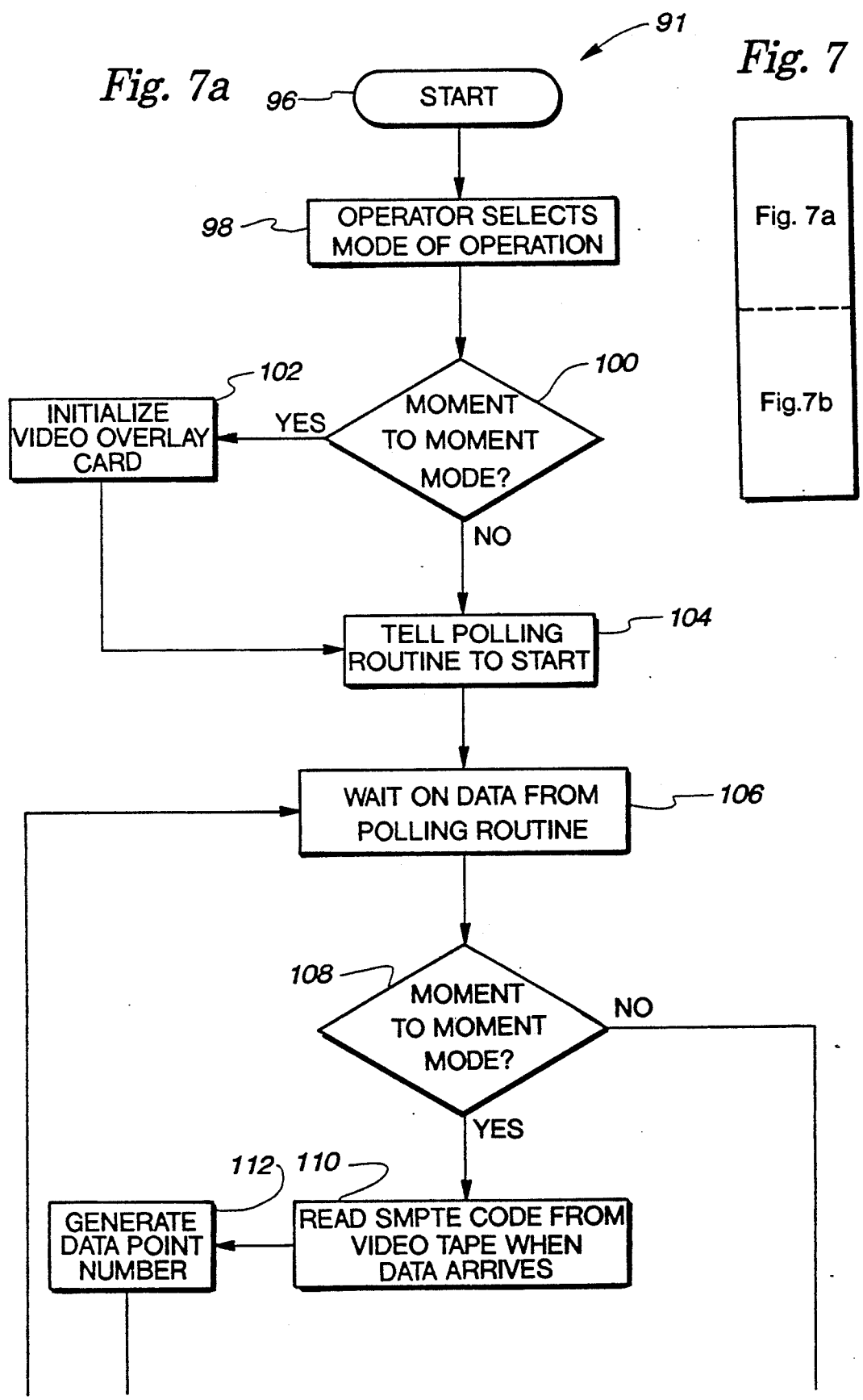

REAL-TIME WIRELESS AUDIENCE RESPONSE SYSTEM

This is a continuation of application Ser. No. 07/697,526 filed on Apr. 29, 1991, abandoned, which is a continuation of application Ser. No. 07/500,144 filed on Mar. 27, 1990, also abandoned.

BACKGROUND OF THE INVENTION

The subject invention relates to viewer reaction systems, to moment-to-moment response measurement systems, and to advertising copy research systems.

More particularly, the present invention relates to a method and apparatus for collecting moment-to-moment viewer reaction to a pre-programmed stimulus from a plurality of remote wireless response devices in real time.

In one application, viewer responses to a video program are collected, analyzed, and displayed on a monitor in real time as an overlay to the said program.

Another application is to use the invention disclosed herein to collect and monitor responses to a pre-programmed set of questions from a plurality of individuals, each equipped with a wireless response unit and proceeding at their own pace.

DESCRIPTION OF THE PRIOR ART

There are a number of prior art systems for researching viewer reactions to video program material. Focus groups rely on a trained moderator to elicit, interpret and document verbal reactions. The validity of this methodology is highly questionable due to domination by the most vocal participants, lack of quantitative measurement and the total reliance on the abilities of the moderator.

Another prior art system involves one-on-one interviews with respondents recruited in public traffic areas (e.g. Shopping Malls). This method requires a long time to recruit the sample and analyze the results. It also doesn't allow for discussion and probing in a group forum.

Another prior art system involves conducting research in movie theatres. These systems rely on antiquated paper and pencil techniques or the obvious imperfections of applause (or laughter) sound measurement.

There are also several electronic prior art systems which attempt to address the short comings of the above mentioned non-electronic techniques. The improvements offered by electronic systems include independent direct measurement of each respondent and faster turnaround time. One such prior art system involves measuring the average resistance (impedance) in an electrical circuit which connects a number of devices (each with a calibrated dial) throughout a theatre or classroom (Papadopoulos et al., U.S. Pat. No. 3,744,712). This system is constrained by the requirement for hard wiring of each hand unit into the circuit. It is also incapable of measuring Yes/No responses to a specific question. It is also incapable of detecting whether or not a respondent is continuing to adjust the dial or has forgotten or refused to participate.

Another prior art system gauges a respondent's reaction to several adjacent video displays by monitoring the single audio track selected and listened to through an earphone (Schwerin, U.S. Pat. No. 3,328,803). This system allows a comparative measure only, without recording absolute reactions to any one program. It also suffers by relying on an individual's ability to watch several screens at once and to make a new choice based on the video portion only. These systems must also be hard wired between the response device and the central monitoring unit.

Another prior art system provides audience feedback to an instructor or moderator who must constantly monitor a grid of lamps which correlate to a yes/no response from each respondent's hard wired switch (Dworetzky U.S. Pat. No. 3,943,641). This system provides no means of averaging/summarizing the plurality of responses, no means of measuring degrees of opinion and no means of knowing how many switches have been left unattended.

Another prior art system is used to measure viewer reaction to television programs in the home (Percy et al., U.S. Pat. Nos. 4,646,145, 4,107,734, 4,308,554). Members of an in-home panel are recruited and equipped with remote push-button consoles which are wired into a response system through the public telephone network to a central Processing site. This system suffers from the lack of prompts and incentives to use the system. Since participation is left totally to the discretion of the panelist, no organized research can be conducted on a specific program or commercial. It is also very costly to maintain on-line communications between each panelist's home and the central site. This system is also hard wired in the home and negates any opportunity for group interaction/feedback to the observed programming. This system is inappropriate for most advertisers and television networks which need research conducted well before the final programs are broadcast to homes.

Another prior art system is the system disclosed in copending U.S. application Ser. No. 07/145,078 which utilizes wireless remote response devices with a polling device wired to a respondent's television set to measure reaction within a group audience environment. Although less awkward for the respondent to use, this system does not permit real time measurement since the recorded data from each unit must be transferred to the central processor after a session. Each polling device is equipped with internal memory, microprocessor and clock capable of recording moment-to-moment responses. Following a session, the data from each unit is transferred electronically to a central processor which collects and analyzes the data. This system has the disadvantage of not being capable of collecting/displaying reactions in real time. It is necessary to pre-program each unit before a session and to subsequently retrieve data from each unit following every session conducted.

SUMMARY OF THE INVENTION

The present invention provides for a method and apparatus for collecting data in real time from respondents using remote wireless response units.

In one embodiment, a central processor continuously polls a plurality of wireless response units. Respondent reactions are, in turn, transmitted from the response units to the central processor. The central processor may then apply behavioral decision rules and editing software to the signals received to analyze the data and display the results in tabular or graphical formats in real time. The system can also create one or more aggregate moment-to-moment response curves which are displayed in real time as a graphical overlay on the particular video program material being tested. The graphical overlay can be displayed on a monitor for the benefit of an operator or client of the system who is interested in audience reaction to the video program material.

It is an object of the present invention to overcome the deficiencies in prior art systems.

The present invention overcomes a number of problems with prior systems, and exhibits several important advantages. In particular, the present invention provides improved research validity by directly and automatically recording individual reactions on a real time basis, independent of moderator bias, and is capable of augmentation through behavioral decision rules.

The present invention improves presentation and interpretation of results through the use of graphical overlays on the video program material.

The present invention improves respondent convenience through the use of compact, hand-held, push-button response units without any confusing dials or cumbersome wires or leads.

The present invention further provides increased portability since the entire system of response units, base station, central processor, monitors and VCR are easily transported and deployed.

The present invention still further provides improved technical control through real-time data collection and presentation permitting operator intervention in case of any technical problems noted during the course of a session.

The present invention also provides immediate feedback results to a client through real-time monitoring of aggregate response.

Finally, the present invention provides enhanced dynamic research capability by enabling the content of a session to be influenced by the intermediate results obtained before conclusion of the session.

The system can be utilized as a self-paced, dynamic market research or educational tool whereby respondents are individually guided through a sequence of questions or steps. The central processor continuously polls all active response units for responses to the questions transmitted to the central processor. The central processor collects, aggregates, edits and displays the results in real time on a monitor viewed by the operator or client of the system.

This system has the advantage of allowing respondents to proceed at their own pace, while allowing the system operator to control the sequence of questions and to monitor results in real time.

The central processor can also modify the sequence of questions or steps for each individual, based on analysis of the prior responses received.

The response unit is a compact, remote, wireless, hand-held device preferably with a 17-button alphanumeric keypad and a 3-digit display. It is battery-powered, contains an RF receiver/transmitter and a short, flexible antenna. The response unit display can indicate the question or step to be answered or acted on by the respondent and can confirm response receipt by the base station.

The entire system is highly flexible, portable and easily transportable for usage at multiple test sites with various room layouts.

BRIEF DESCRIPTION OF THE DRAWINGS

FIG. 2 is a front pictorial view of a response unit.

FIG. 3 is a block diagram of the electronic subsystems of the wireless response unit.

DETAILED DESCRIPTION

Figure 1:
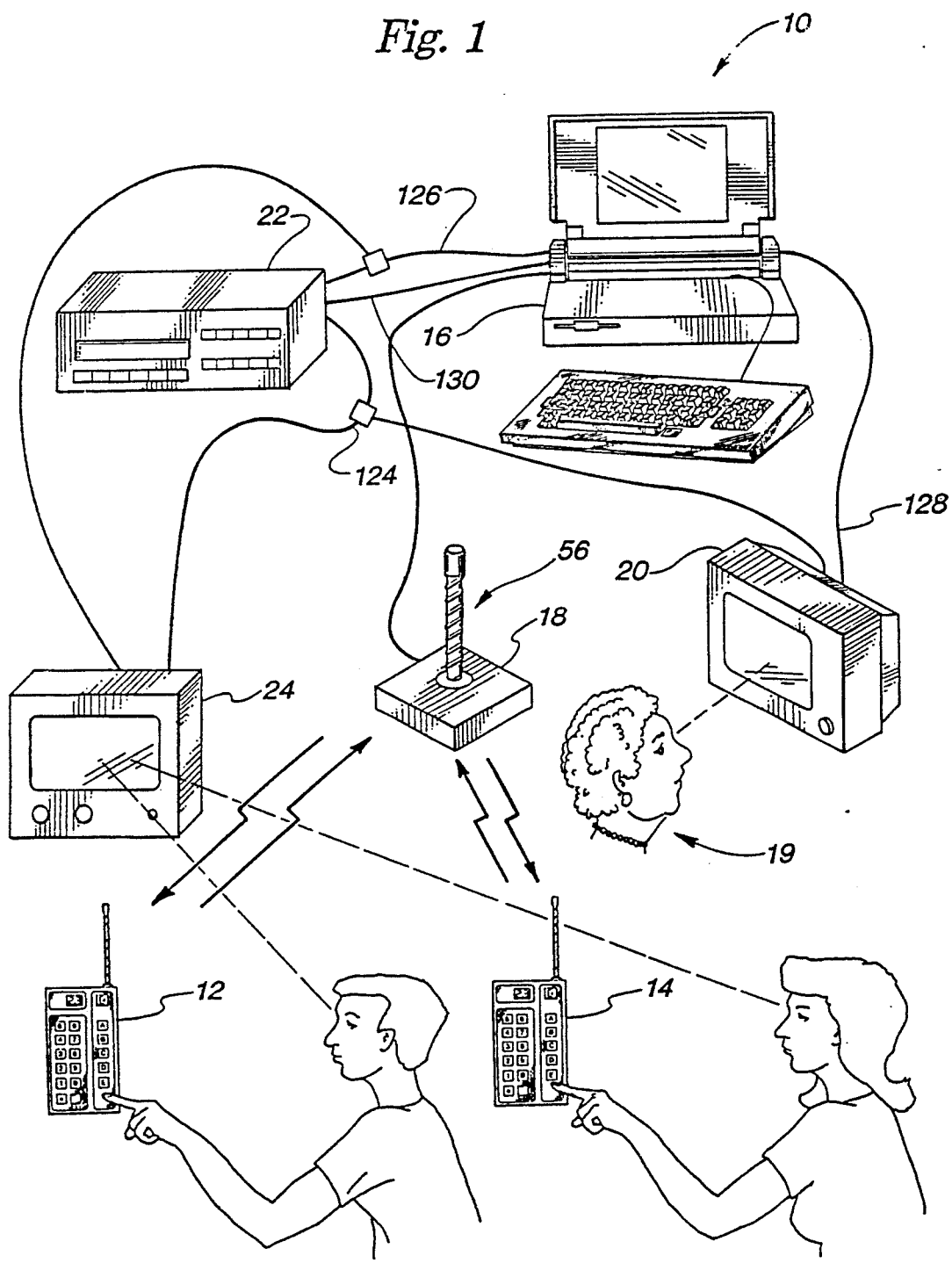
FIG. 1 is an overview of the system comprising the invention.

FIG. 1 presents an overview of a system 10 which includes a plurality of wireless response units 12, 14, a central processor 16 with a base station 18, an observation monitor 20 for observing the analyzed response data and a VCR 22 with respondent display monitor 24. It is to be understood that monitor 24 is viewed by respondents operating units 12, 14 while monitor 20 is not ordinarily viewed by respondents, but rather only by an operator 19 in control of system 10 via processor 16.

FIG. 2 depicts one of the wireless response units 12 in more detail. Each response unit 12 preferably has a push button keypad 26, a Liquid Crystal Display (LCD) 28 and a flexible antenna 30 used to transmit and receive data with base station 18.

A block diagram of the electronics in the wireless response unit 12 is shown in FIG. 3. Each hand-held, wireless response unit 12 preferably contains a 3-position, 7-segment LCD screen 28 for displaying messages sent from the central processor 16, the push-button keypad 26 for registering responses, an addressable asynchronous receiver/transmitter (AART) 32, an RF receiver/transmitter (RF transceiver) 34, a commonly available 9-volt battery 35 and an on/off switch 37. The addressable asynchronous receiver/transmitter 32 is preferably a Motorola MC14469 IC. Each response unit 12 preferably contains a unique seven bit address set by the address jumpers 36, read by the AART 32. The keypad 26 preferably has seventeen buttons that are organized as a matrix of 6 rows and 4 columns. The keypad matrix may be interfaced to the AART 32 by a 20-key encoder 38 which is preferably a MM74C923 IC from National Semiconductor. The display 28 preferably uses a four digit LCD module made by LXD under part number 34D5F02K. The display is interfaced to the AART 32 by an Intersil ICM7211MIPL display driver or encoder 40. Although the display contains 4 digits, only three of these digits are used and visible. The transmit output pin 42 of the AART 32 is connected to an FM modulated, 49 Mhz transmitter 44. The receive input pin 46 of the AART 32 is connected to an FM demodulated, 27 Mhz receiver 48. The transmitter 44 and receiver 48 together form transceiver 34 and are connected to the antenna 30. Alternatively, the response unit may transmit response data to the central portion using any of the following: a wireless optical link, an infrared communications link, a wireless acoustic link or an ultrasonic communications link.

Communication to and from each response unit 12 is by serial asynchronous message packets. A message received by the response unit contains a unit address and instructions to update the display. If the address contained in the message matches the address of the unit set by jumpers 36, then the unit responds by updating the display 28 and transmitting a message packet back to base station 18. A message transmitted by the response unit contains confirmation of the contents of the display 28, the code for the most recent key pressed on the response unit (if one has occurred) and a low battery voltage indication (when that condition exists).

Figure 4:
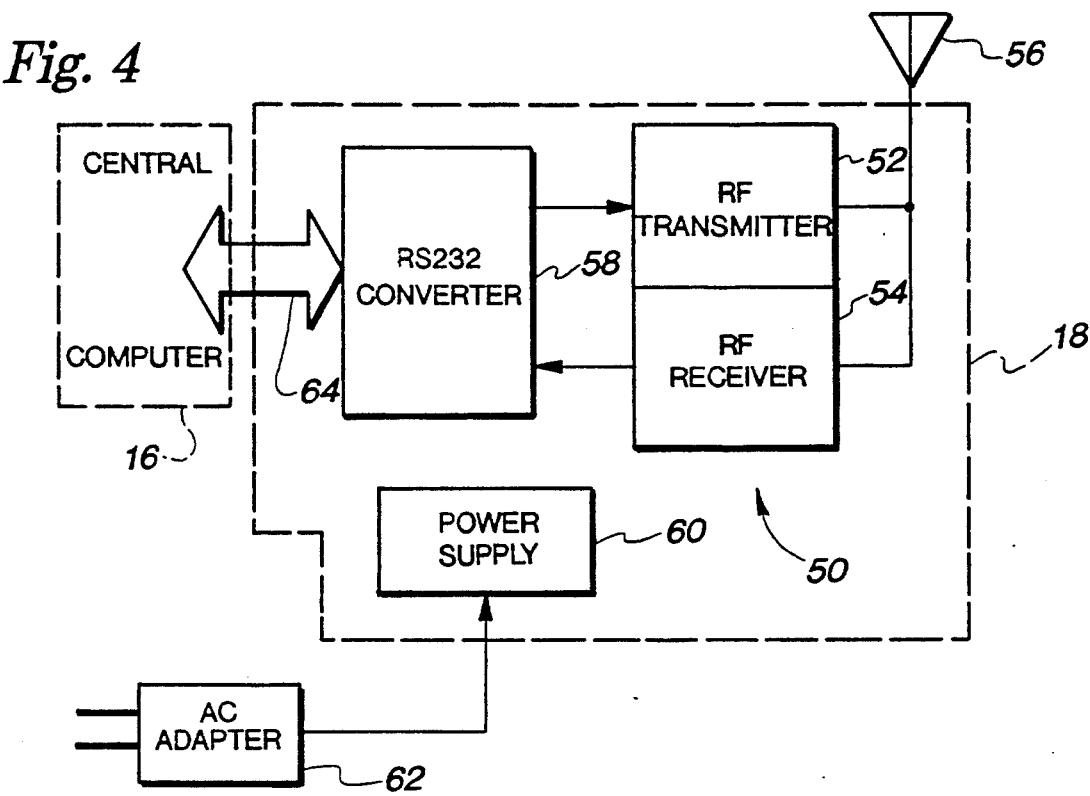
FIG. 4 is a block diagram of the base station.

A block diagram of the electronics in the base station 18 is shown in FIG. 4. The base station contains an RF transceiver 50 made up of a 27 Mhz transmitter 52 and 49 Mhz receiver 54 connected to a compact flexible antenna 56 which is appropriate for these frequencies. It contains a RS-232 converter 58 which changes the logic levels used by the transceiver 50 to standard RS-232 interface logic levels. Power to the base station 18 is provided by an internal power supply 60 and low voltage AC adapter 62.

The RS-232 interface 58 in the base station is connected to the central processor 16 with a standard serial cable 64. Serial asynchronous characters are exchanged between the base station 18 and the central processor or computer 16. Characters from the central processor 16 modulate the 27 MHz transmitter 52 in the base station 18. The 49 MHz signals from each particular response unit 12, 14 is received by the 49 MHz receiver 54 in the base station 18 and demodulated to recover the characters transmitted from that specific response unit.

Figure 5:
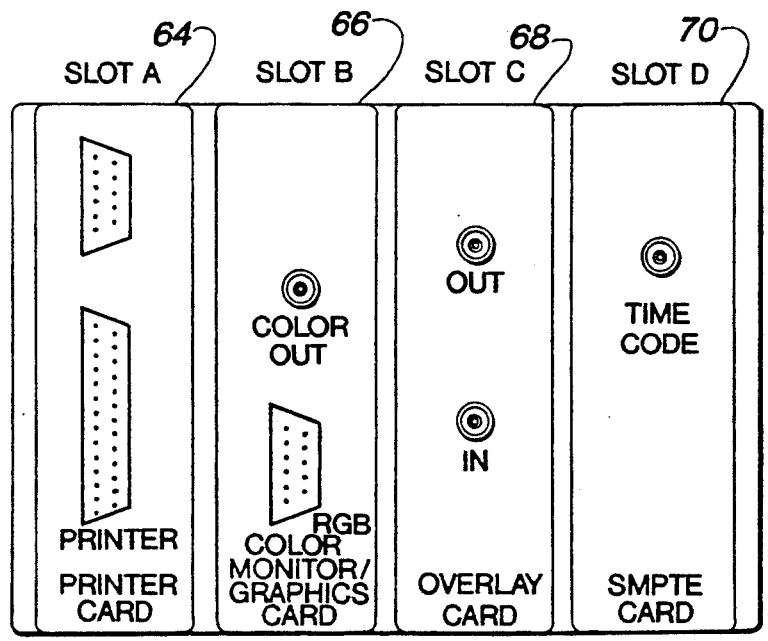
FIG. 5 is a view of the back of the central processor showing the location of and connections to the four cards plugged into expansion slots of the central processor.

The central processor 16 is preferably a commercially available Compaq Portable II, Model 4 computer with 640K of internal RAM, a 20 megabyte hard disk, a 360 kilobyte floppy disk and built-in monochrome monitor. As shown in FIG. 5, it has a Compaq Multipurpose I/0 card 64 connected to the RS-232 interface of the base station 18, a Compaq Video Display color graphics adaptor card 66 to drive an internal video overlay card 68 which is a U.S. Video Model 400 to overlay the aggregate response graphs onto the video program material being tested, and a Scriptek SMPTE reader card 70 which reads and decodes the SMPTE time code from a videotape. The central processor 16 can determine the precise position of a videotape at any time by reading the SMPTE time code. The central processor 16 runs applications software for polling each of the individual response units, and collecting, editing, analyzing and displaying data. Each response unit 12, 14 has a unique address and is polled in sequence by the central processor 16.

Figure 6:
FIG. 6 is a flow chart for the polling routine as done by the central processor.
Figure 6A:
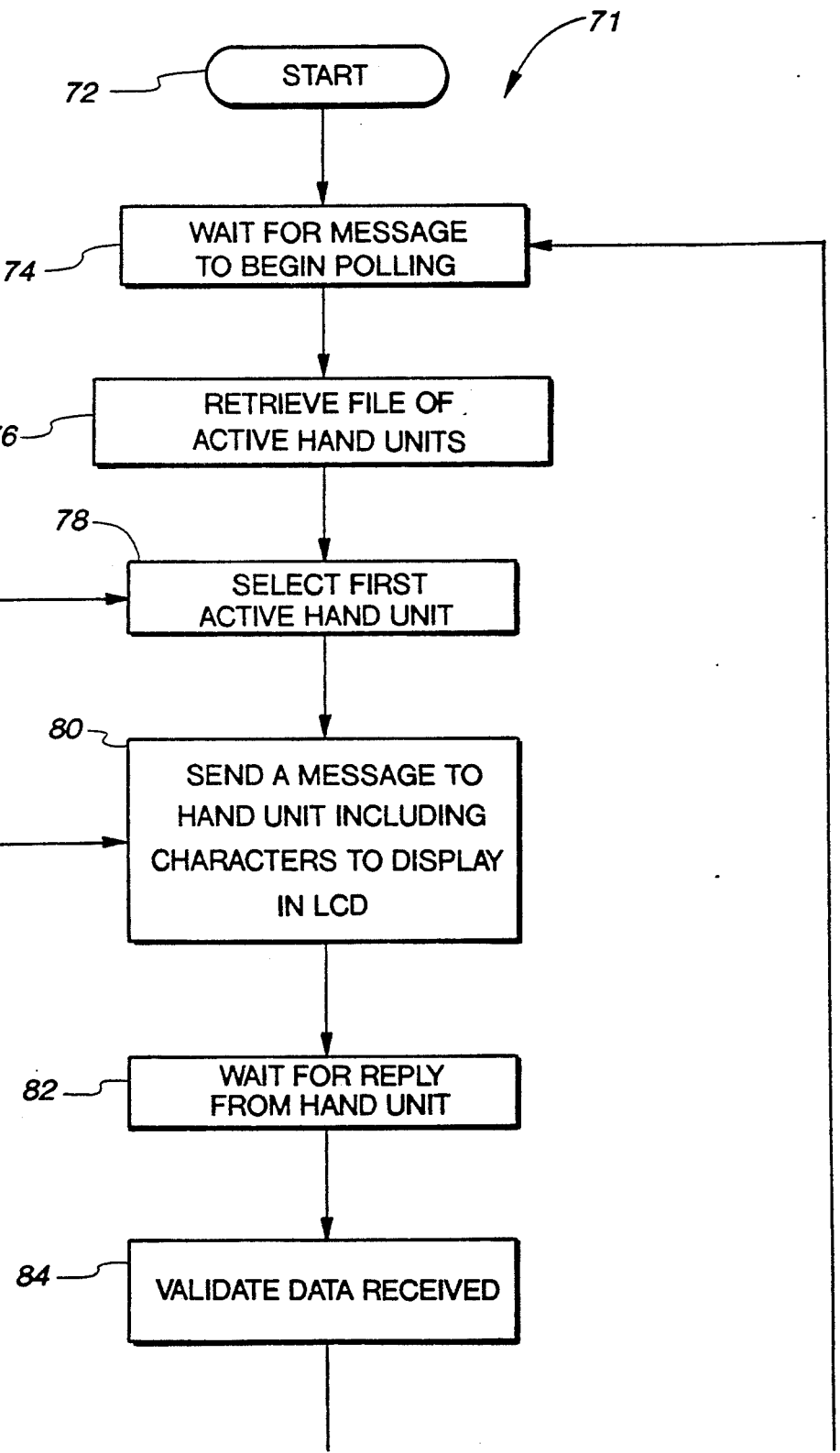
Figure 6B:
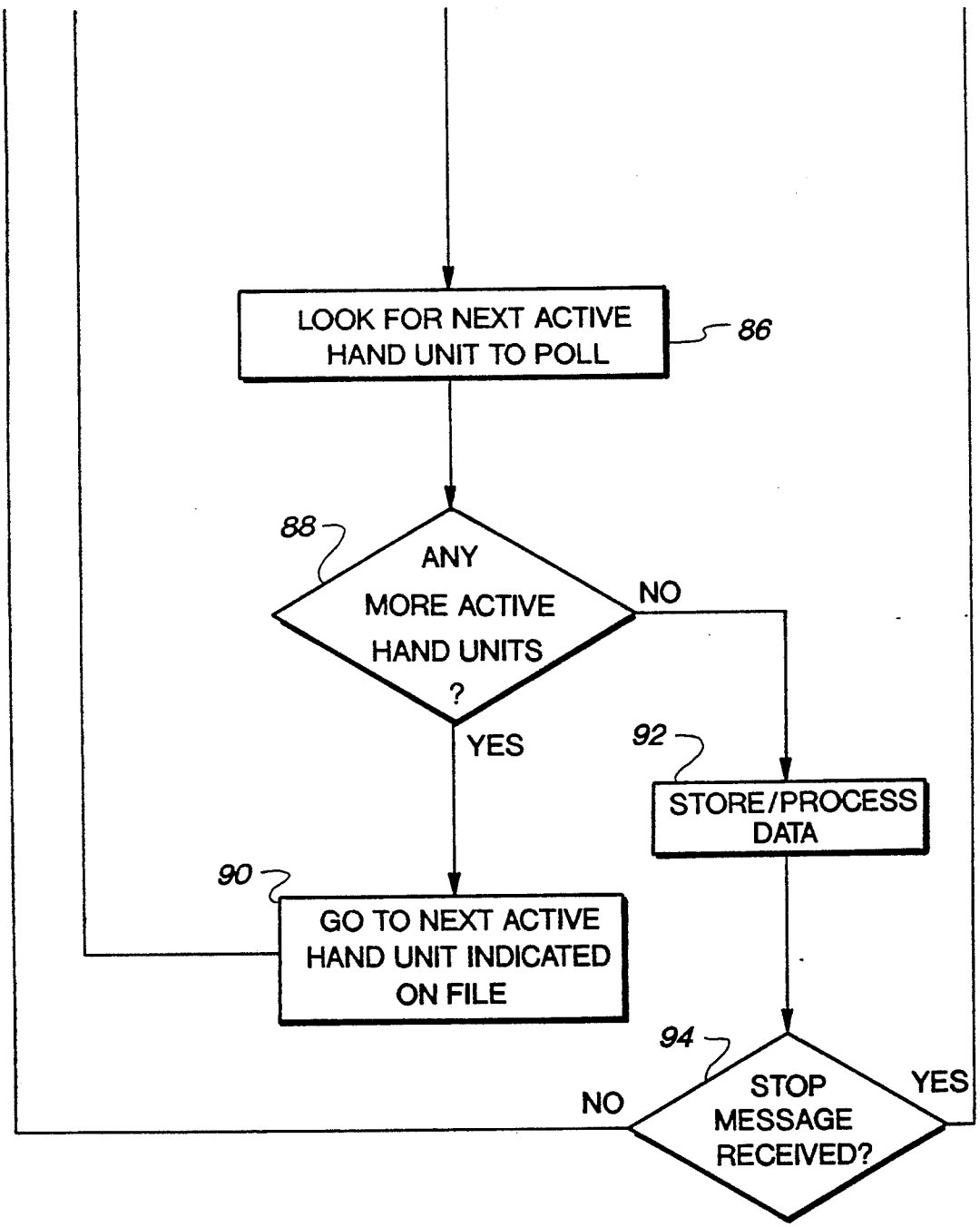

Referring now to FIGS. 6, 6a, and 6b, a flow chart for a software module 71 that runs on the central processor 16 and is used to poll units 12, 14 in sequence is illustrated. Module 71 is started at block 72 by a higher level task and once started it will continue to operate independently until it is canceled by the task that initiated it. One such task is a software module that controls the data collection and the graphical overlay on the Observation Monitor 20 during a moment-to-moment session.

Initially module 71 waits at block 74 for a message to begin polling. When the polling module receives a signal to commence the polling cycle, it retrieves a file from a disk that contains a list of the active hand units to be polled at block 76. This file is generated at the time that the system is initialized. The first active hand unit 12 to be polled is selected at block 78 and a message is sent to this hand unit at block 80. This message contains characters to be displayed in the LCD display 28 of the hand unit 12 and prompts the hand unit 12 to reply with collected data. The central processor 16 is programmed to wait at block 82 between 50 msec and 100 msec for the hand unit 12 to reply. When the reply is received this data is validated at block 84 for communication errors and checked to ensure that the data received is within an allowable range. If there is no reply from the hand unit 12 within the allowed time or the data is considered invalid, no data is stored or transferred for this active hand unit for the current polling cycle and the hand unit 12 will be repolled in the following cycle.

The system 10 then checks at block 86 to determine if there are any active hand units (such as unit 14) that have not been interrogated during the present polling cycle. If an unpolled hand unit does exist as determined at block 88, the system 10 selects the next active hand unit 14 (at block 90) indicated on the file and initiates the communication process with this hand unit. In the case where all active hand units have been polled in the present polling cycle, the collected data is routed to be either stored or transferred to the higher level task that originally initiated the polling routine as indicated at block 92. If a stop message has not been received at block 94 by the polling module 71, the system 10 once again selects the first active hand unit 12 from the list of active hand units and commences another iteration of polling all of the active hand units. The system 10 continues the polling routine 71 until a stop message is received at block 94 from the operator 19 or a higher level task.

Figure 7B:
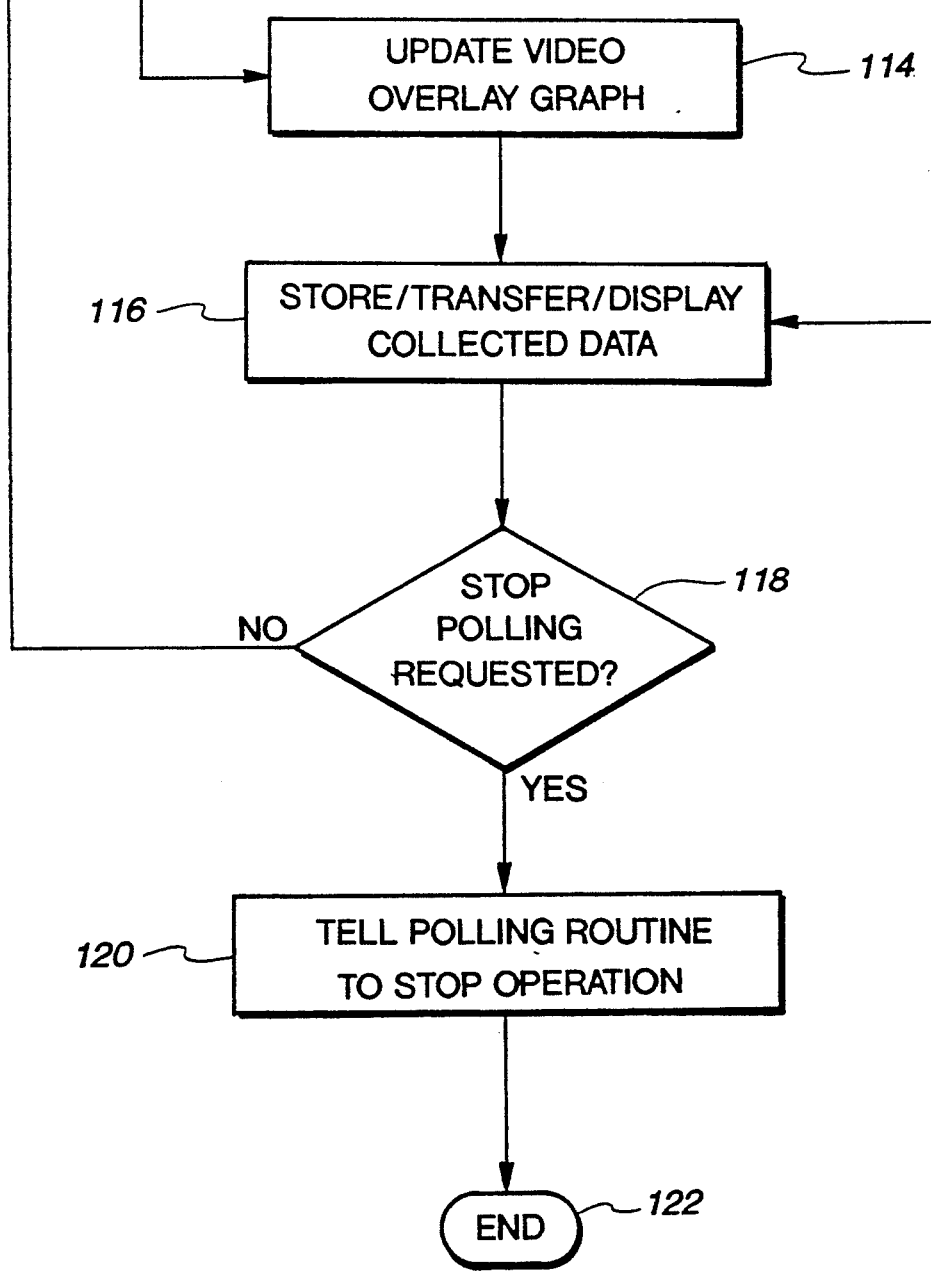
FIG. 7 is a flow chart for the moment-to-moment and question modes.

Referring to FIGS. 7, 7a, and 7b a flow chart for the software used to collect, store and display the data during a moment-to-moment or question mode session is shown. This module 91 is entered at block 96. When the system operator selects the moment-to-moment mode of operation at blocks 98, 100 the video overlay card is initialized at block 102 and a signal is sent at block 104 to the polling module 71 to commence operation. When the system receives the data from the polling routine at block 106 and verifies the moment-to-moment mode at block 108, the SMPTE time code is read from the videotape at block 110 and a data point number is generated at block 112. At block 114 the data and data point number are used to update a graph that is being overlayed on the tested video program material and displayed on the observation monitor 20. The data and associated data point number are also stored at block 116 so that the graph may be regenerated and/or the data further analyzed. If no request to stop polling has been received at block 118 the system will wait on new data from the polling routine and repeat the process previously described. If a request to terminate polling is received at block 118, module 91 sends a message at block 120 to the polling module or routine 71 to terminate its polling operation at block 122. The central processor 16 will then await further instructions from the system's operator.

When a question mode is selected it is not necessary to initialize the video overlay card 68 so this procedure (at block 102) is by-passed and the polling routine 71 is instructed to commence. Reading the SMPTE code, generating a data point number and updating the video overlay graph are the other procedures (at blocks 110-114) that are by-passed while in question mode. Once the data arrives from the polling routine 71 it is stored and transferred to be displayed on monitor 20 connected to the computer 16. Similar to the moment-to-moment mode, while in question mode the system 10 will continue to poll, store and display data until a stop request is received.

Figure 8:
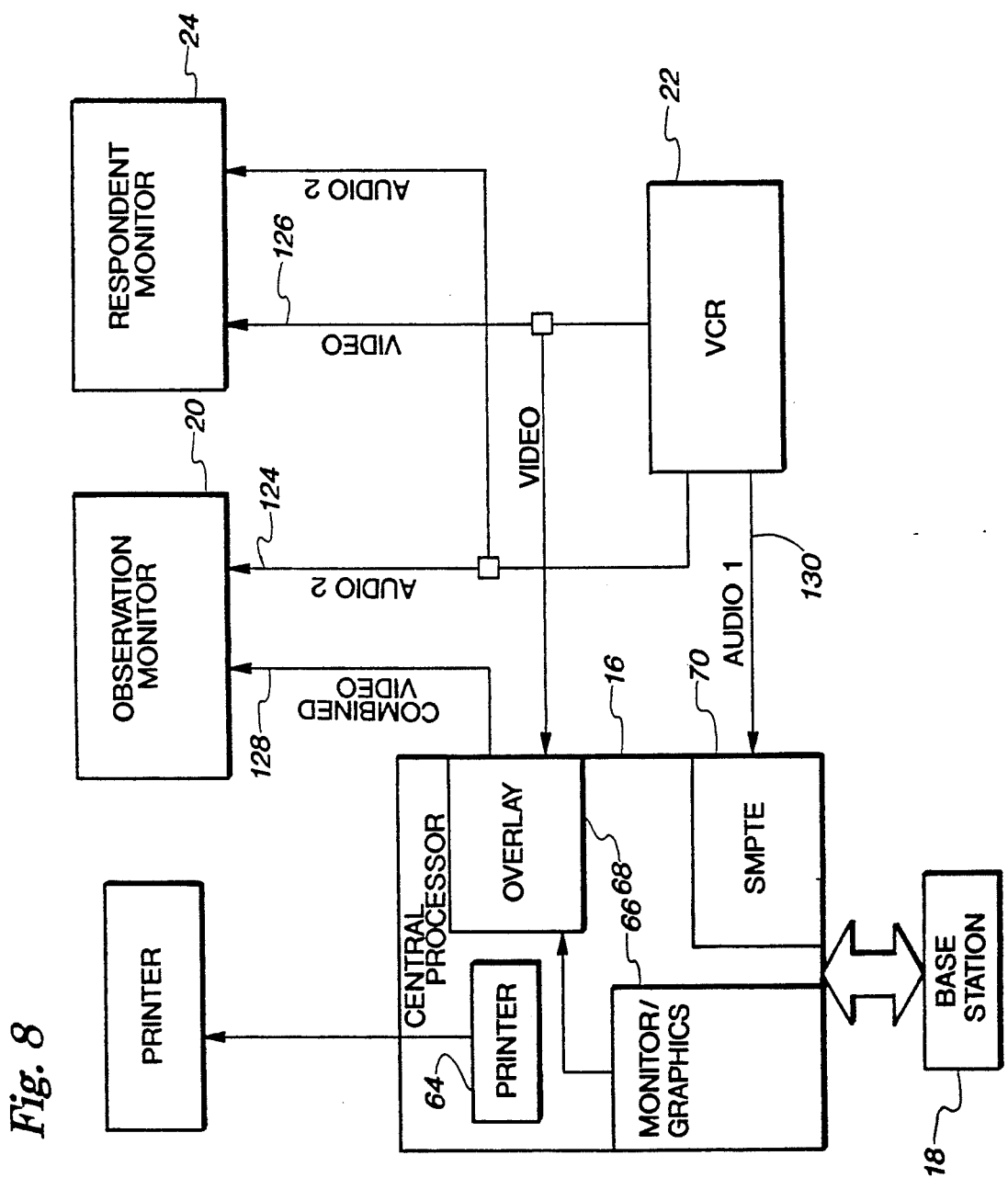
FIG. 8 is a block diagram illustrating the video flow from the VCR to central processor and the Observation and Respondent video monitors.

Referring now to FIGS. 1 and 8, the observation monitor 20 is any commercially available television monitor with a composite video input such as a Sony model PVM-1350. Connection to the central processor 16 is via coaxial cable 128. A separate audio input is provided by cable 124.

The VCR 22 is any commonly available videocassette playback machine such as a ¾" Sony VP-5000 which is compatible with the tape format of the test material. VCR 22 is connected to central processor 16 and monitor 24 by coaxial cable 126. Cable 130 provides SMPTE time code information from VCR 22 to central processor 16.

The respondent display monitor 24 may be any commonly available television set with composite video input, such as a Sony Model PVM-1350, and is also connected with coaxial cable 124 to the video output of the VCR 22.

Some of the applications of this invention require that the central processor 16 be capable of determining the position of a videotape that is being played back in the VCR 22. The position of the tape is determined by reading a SMPTE time code that has been previously recorded on the tape. A time code generator such as a FOR.A Model FA-410 can be used to produce the SMPTE time code. The code is recorded on the Audio Channel 1 track of the edited videotape and uniquely identifies each frame on the tape to be tested.

One application of system 10 is a moment-to-moment research project as diagrammed in FIG. 1. Approximately 20 to 30 respondents are group environment for a 1-2 hour session. They are asked to evaluate some video program material and respond to related questions.

The operator 19 initializes the system 10 prior to conducting a moment-to-moment session. The operator 19 uses a standard video tape editing suite to prepare a videotape of the test material together with any filler material in the desired sequence. The operator also uses the time code generator to record the SMPTE time code on the edited videotape. The central processor 16 is programmed to control the collection of the responses and the interpretation of the data, including the scale definition for buttons 26 on the response units 12, 14 and the desired sampling rate. In addition, all closed-end questions and corresponding multiple choice answers are entered on the computer as numeric codes.

At the start of a typical session, the operator will show a preview of the video material to orient the viewers to the subject material. Each respondent is then given a response unit 12 and brief instructions on usage. The operator then initializes all of the units through RF signal communications between the central processor 16 and each of the individual response units 12, 14. Then the edited video test tape is shown a second time and moment-to-moment viewer responses are entered by pressing buttons 26 on the hand-held units 12, 14. Each response unit 12, 14 is polled continuously by the central processor within a one-second cycle and any entered response is captured and transmitted back. The individual moment-to-moment response data from each unit is also synchronized with the SMPTE time code of the corresponding video tape and stored in a data file in the central processor. During the session, the operator 19 is able to monitor the real-time responses on the observation monitor 20 to confirm that the system 10 is functioning normally and that the respondents are following instructions. The moment-to-moment response data for each unit is processed by software which analyzes and, if necessary, adjusts the response data according to pre-programmed behavioral decision rules. The resultant "aggregate" moment-to-moment response data can be displayed in real-time with less than 2 seconds delay on the observation monitor 20 as a graphical overlay on the corresponding video material as it is being shown to the respondents.

It is not an absolute requirement that the presentation being evaluated by a moment-to-moment session be recorded on videotape. An internally generated time base can be used to allow testing of a live presentation. When a live presentation is evaluated, the internally generated time base is used to determine the time of the presentation at which each key is depressed. It is possible to record the live presentation on videotape as it is being evaluated and then, after processing the data, produce the graphical overlay on the videotape of the live presentation.

During the course of a moment-to-moment session, the respondents may also be asked to respond to closed-end multiple-choice questions. These questions are numbered and displayed to the respondents in sequence on the respondent video display monitor 24 or on a flip chart. The respondents enter their answers using the wireless response units 12, 14. Each question number appears on the display 28 of the response unit 12 and the respondents enter the answer on the response unit by pressing the key which corresponds to the desired answer.

Figure 9:
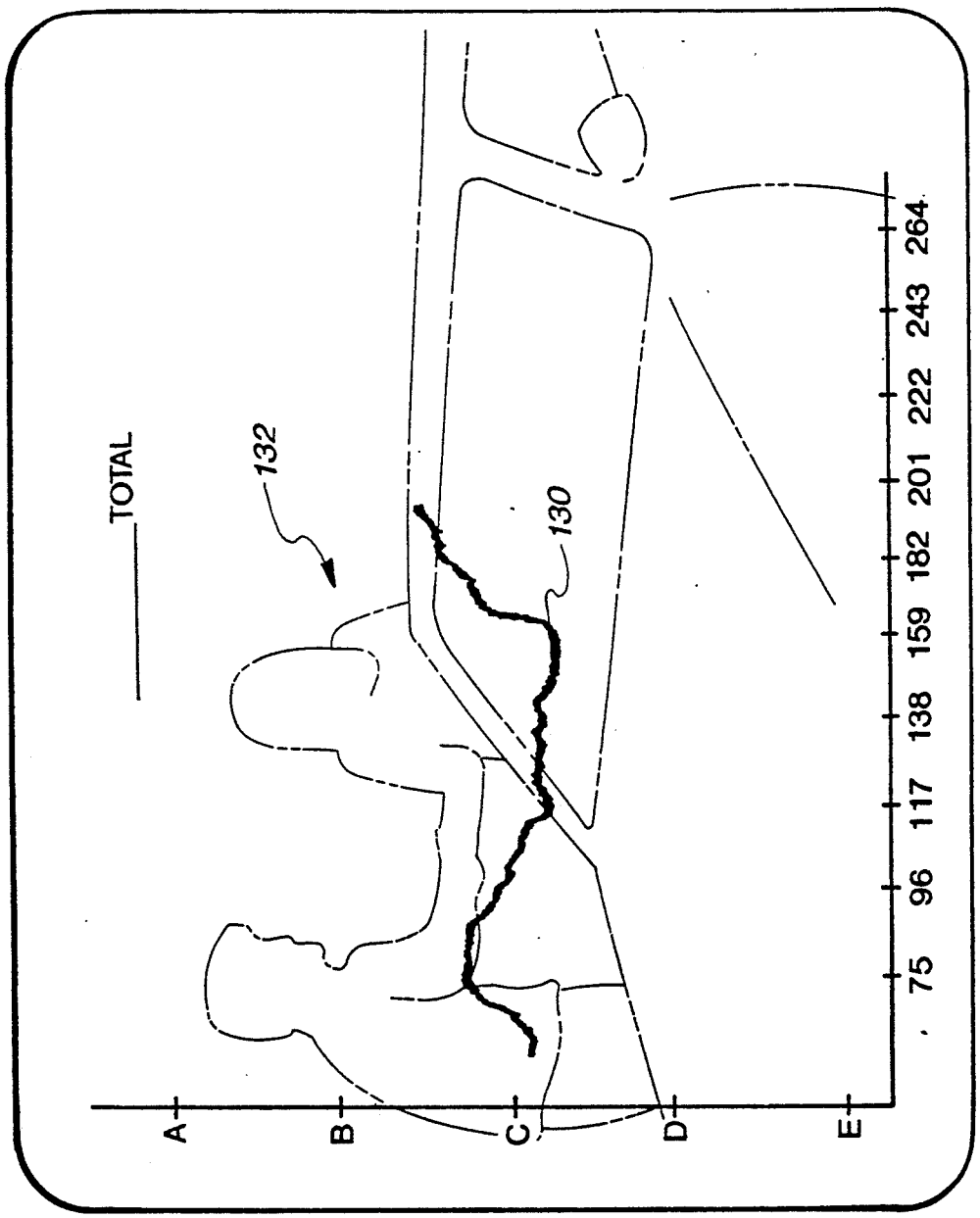
FIG. 9 is a simplified pictorial view of a graphical overlay of the moment-to-moment responses of an audience on a video screen image.

At the conclusion of any specific segment of a session, the individual moment-to-moment responses collected are processed by software in the central processor 16. Aggregate results are calculated for predetermined demographic groups. During playback of the video material previously tested, selected aggregate response patterns can then be displayed on the observation monitor 20 as graphical overlays 130 on the corresponding video program material 132 as depicted in FIG. 9. Multiple data sets corresponding to different demographic groups of respondents can be displayed on the same graphical overlay. The responses can also be displayed in isolation in tabular or graphical form without the video program material content.

The data collected from closed-end multiple choice questions may also be displayed on the observation monitor 20. Aggregated results are calculated and these may be displayed in either graphical or tabular form depending on which one is selected by the operator 19. The display is updated by the software in the central computer 16 as the responses are received from the respondents via the polling routine 71.

Figure 10:
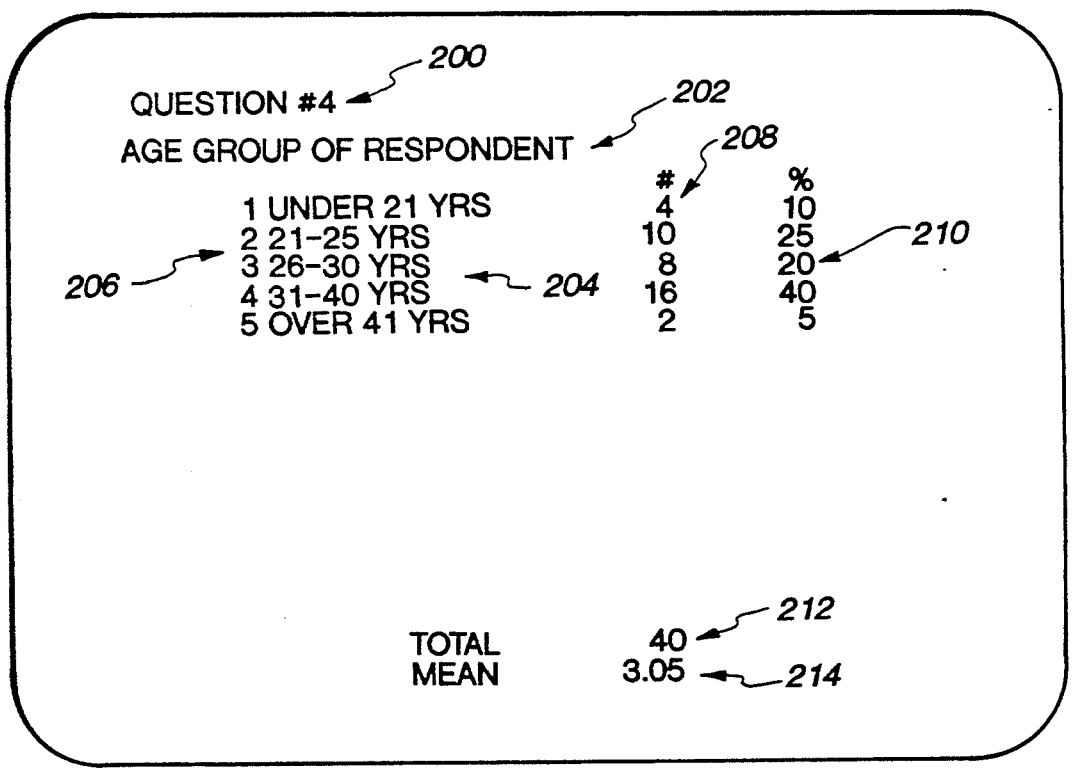
FIG. 10 is a typical display of question mode data in a tabular form.

Referring to FIG. 10, a typical display of question mode data in a tabular form may be seen. The display includes a question number 200 and a question title 202. Descriptive labels 204 associated with response choices 206 for the question 200 are also displayed on the observation monitor 20. The results are displayed as both the number of respondents 208 that selected each choice and the corresponding percentage 210 of respondents that selected that choice. The total number 212 of respondents replying to the question is also shown. A mean respondent score 214 is also calculated by software in the central computer 16 and displayed on the monitor 20. The mean 214 is the weighted average respondent score and is calculated using the numerical values corresponding to the choices presented to the respondents. In the case where the choices are alphabetic (A-E) weights of 10-14 are assigned to A-E respectively.

Figure 11:
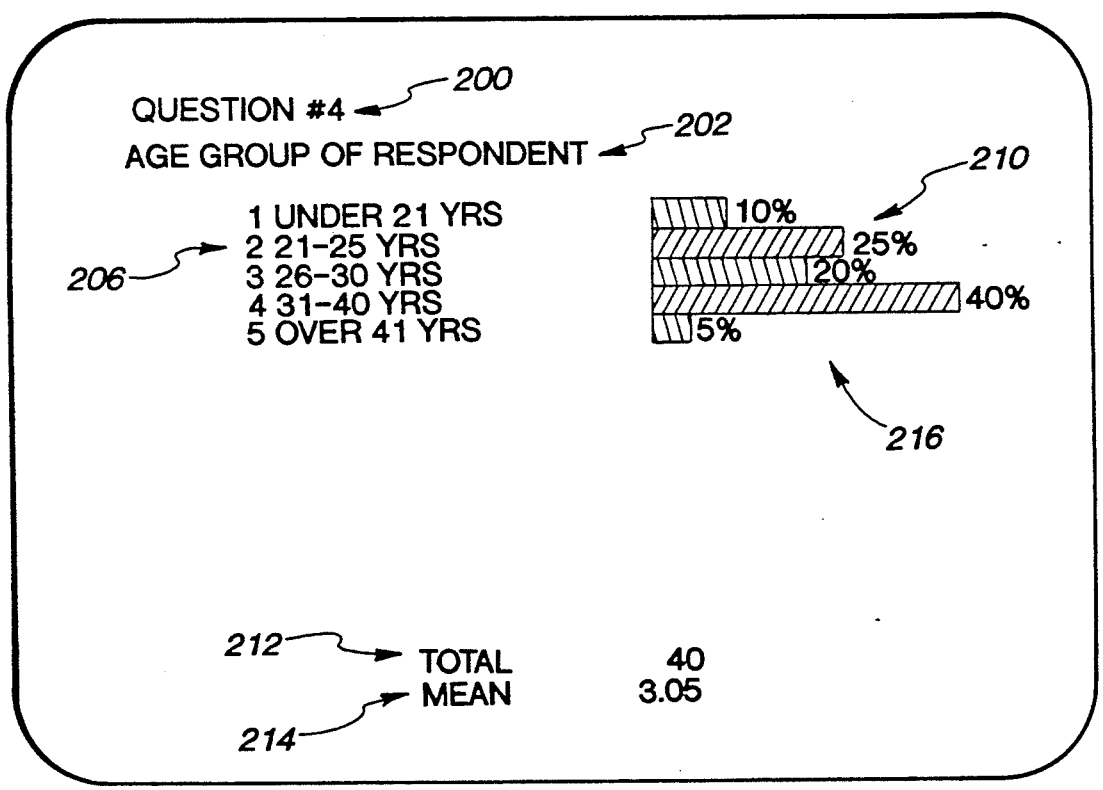
FIG. 11 is an illustration of the graphical display for question mode data.

Referring to FIG. 11 an illustration of the graphical display for question mode data is depicted. This display also includes the question number 200 and its title 202. The percentage of respondents replying to each choice 206 is represented as a horizontal bar 216 where the length of the bar is proportional to the calculated percentage for that choice. The corresponding percentage 210 for each choice is also shown along with the total 212 and mean score 214. The mean score is calculated as previously described. Although FIGS. 10 and 11 show questions with only five choices it is to be understood that the system is capable of having up to 14 different choices per question. Both the tabular and graphical displays show the results of choices that have been preselected for the question. One of the features of question mode is the ability of the software to record the amount of time taken by each respondent to respond to a question. The time that is recorded is the time duration between commencing the polling routine 71 to collect data for a question and the receipt 82 of a respondent's answer. More particularly, respondent response time is measured from the execution of block 80 (FIG. 6a) to the time a response is received at block 82. The system also has a utility to convert this data to a form so that it can be analyzed using a commonly available statistical software package.

Figure 12:
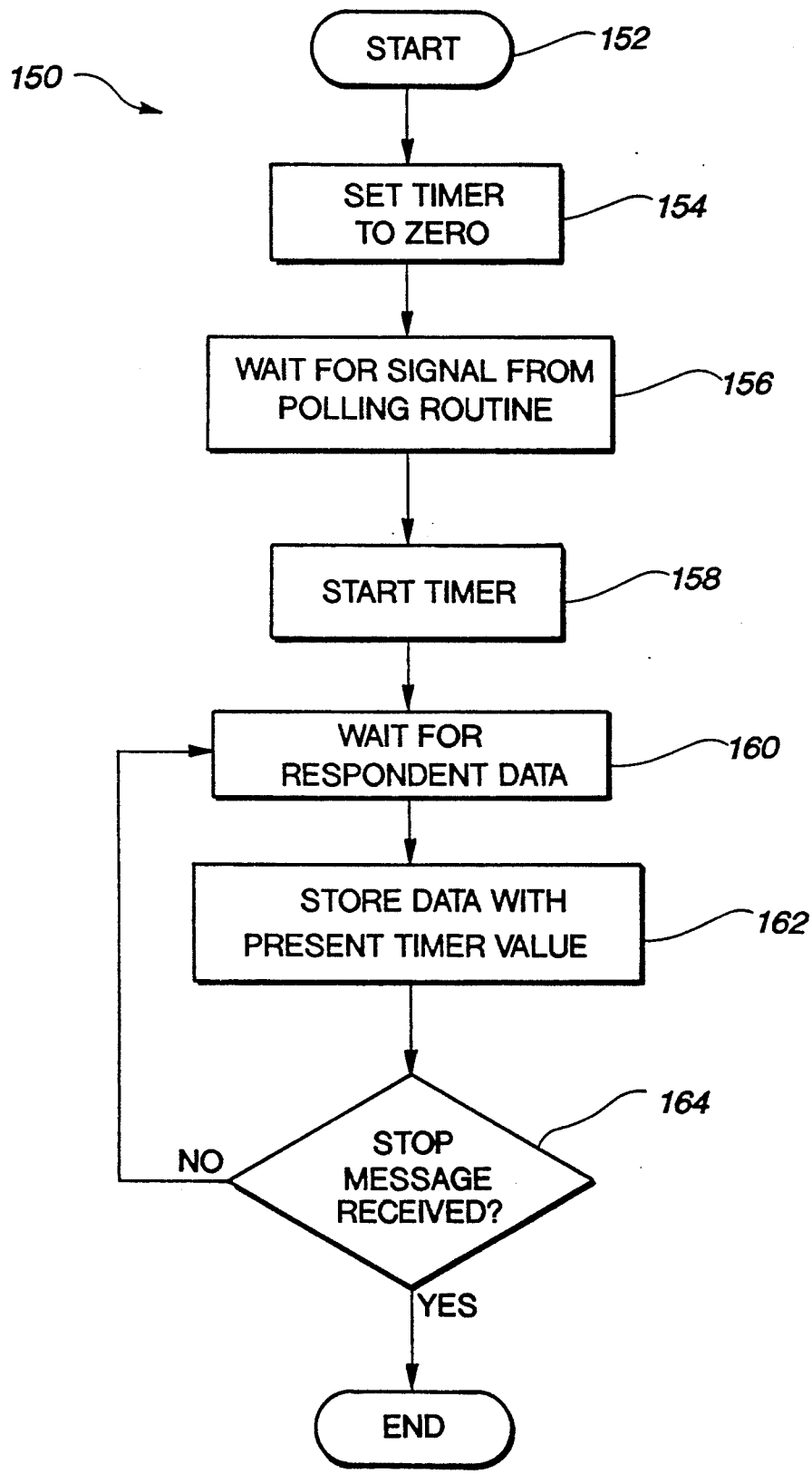
FIG. 12 is a flow chart used to measure and store the respondent's time duration.

Referring to FIG. 12 a flow chart of module 150 used to measure and store the respondent's time duration is illustrated. This module 150 is entered at block 152. When the system operator selects the option to measure the respondents time delay, an internal timer of system 10 is set to zero at block 154. When a signal is received at block 156 that the polling routine 71 has commenced, the timer is immediately started at block 158. The system waits at block 160 until respondent data is received at which time it will proceed to block 162. At block 162 it will read the present value of the timer and then store the collected respondent data with this value. If no stop message has been received it will once again wait at block 162 for more respondent data. If a stop message is received no more time duration data will be collected for that question. The system 10 is able to measure, store and display (on the observation monitor 20) individual response times on a per respondent and per question basis.

It is to be understood that several group sessions may be conducted for a single project in order to test the desired number of respondents. The data from these multiple tests can be accumulated in one large data set. At the conclusion of all the test sessions, the accumulated data can be processed and displayed as described above.

Another application is a self-paced research survey. In this application, respondents use the response units to enter answers to a sequence of closed-end multiple-choice questions from a questionnaire provided to them in electronic or hard copy format. For each question in sequence, the number of that question is transmitted via an RF signal from the central processor 16 and addressed to each individual response unit 12. The question number is displayed until the respondent enters a response by pressing the buttons 26 on the response unit 12.

Prior to conducting the self-paced survey, the operator initializes the system. The questions and corresponding multiple-choice answers are prepared and entered into storage on the central processor 16. Then the question numbers, together with the corresponding multiple-choice answer numerical codes, are loaded into the survey control program in the central processor 16. The respondents are recruited according to the research specifications of the particular project. Just prior to commencing the survey, all the hand-held response units 12, 14 are initialized by the central processor 16.

Each respondent is given a response unit 12 and instructions on how to proceed through the questionnaire. The questionnaire may be handed out as a printed paper form or can be displayed on monitor 24 under the control of the central processing unit 16.

In an alternative application, the respondents may be instructed to walk past a number of test stations where some material is shown and some questions are posted. For each individual respondent, the central processor 16 first initializes the particular response unit 12 and then guides the respondent through the entire sequence of questions with a series of prompts displayed on the LCD screen 28 of the individual response unit 12.

Each response unit 12 that has been initialized is polled in one second intervals by the central processor 16. Each entered response is transmitted back to the central processor 16 where it is checked to determine if it is a valid response. Valid responses are stored in the collected data set. If an invalid answer is received for a particular question, the central processor 16 transmits the number of that particular question back to the response unit 12 and the respondent is prompted to answer that question again. If 3 invalid responses are received to the same question, the central processor 16 records an error flag for that question and transmits a prompt for the next question. When the response to the final question of the questionnaire is received by the central processor 16, the complete set of answers for that respondent is stored in a data file.

Following completion of the questionnaire by the final respondent, or at any intermediate point in time, an operator can run the completed responses through a statistical software package and obtain the aggregate results in both numeric and graphical formats. By collecting personal data from respondents, the results can be tabulated and analyzed according to selected demographic and psychographic segments.

The portability of the system allows a survey to be conducted at almost any site and the data collection can be extended over an indefinite time period as each respondent completes the survey independently and at their own pace. The only requirement is that the entire survey be conducted within the range of the RF transceivers 34, 50 used.

The invention is not to be taken as limited to all of the details thereof as modifications and variations thereof may be made without departing from the spirit or scope of the invention.

What is claimed is:

1. A system for real-time collection of data from a plurality of respondents comprising:
   a) a central portion having a central processor and a radio base station;
   b) a remote portion having a plurality of wireless radio response units each having a display, the response units being in wireless communication with the radio base station for transmitting response data from individual respondents to the central processor wherein the central processor transmits a series of asynchronous message packets, each message packet containing a display update instruction and a message address corresponding to a unit address of the wireless radio response units, reception of the packet by the corresponding radio response unit causing the corresponding unit, in turn, to alter the display of the corresponding unit in accordance with the display update instruction and to transmit the response data from the individual respondent to the central processor, which when received by the central processor causes the central processor to i) check the validity of the data and send an invalidity message to response units which transmit invalid data, ii) accumulate valid individual response data and iii) provide a real-time display of accumulated response data.

2. The system of claim 1 wherein a unique address is appended to individual response data of each response unit.

3. The system of claim 1 wherein the base station and each response unit each respectively further comprise a radio transmitter and receiver.

4. The system of claim 3 wherein the base station transmitter and the response unit receivers have a common first carrier frequency.

5. The system of claim 4 wherein the base station receiver and the response unit transmitters have a common second carrier frequency.

6. The system of claim 5 wherein the first and second carrier frequencies are different from each other.

7. The system of claim 3 wherein the base station transmitter and receiver share an antenna.

8. The system of claim 3 wherein the transmitter and receiver in a particular response unit share an antenna.

9. The system of claim 1 further comprising a first video monitor means for displaying program material to the respondents.

10. The system of claim 9 further comprising a second video monitor means for displaying the accumulated response data.

11. The system of claim 10 wherein the second video monitor means further comprises displaying the accumulated response data as a graphical overlay on the program material.

12. The system of claim 11 wherein the second video monitor displays the accumulated response data synchronized to the program material.

13. The system of claim 1 wherein the display of the remote portions provides a visual indication to the individual respondents that the response data was received by the central portion.

14. The system of claim 1 wherein the invalidity message transmitted by the central processor portion of the central portion causes the display of the remote portion which transmitted invalid data to indicate that the transmitted data was invalid.

15. A method of collecting data from a plurality of respondents comprising the steps of:
   a) displaying a sequence of visually perceptible images to a plurality of respondents, with each respondent having a wireless remote response unit having a display;
   b) transmitting a plurality of asynchronous message packets, each message packet containing a display update instruction and a message address corresponding to one of the plurality of unit addresses of the wireless radio response units;
   c) promoting the plurality of respondents to enter response data into their respective response units by displaying a prompt on the display of their remote response unit in response to the display update instruction received;
   d) transmitting the response data from each of the remote response units to a central base station as each unit receives a message packet containing the message address corresponding to the unit;
   e) checking the validity of the response data at the central processor of the base station and then transmitting an invalidity message to remote response units that transmit invalid response data;
   f) accumulating response data in a central processor associated with the base station; and
   g) displaying the accumulated response data in real time.

16. The method of claim 15 wherein step a) further comprises displaying previously recorded video program material.

17. The method of claim 15 wherein step a) further comprises display a live presentation.

18. The method of claim 15 wherein step a) further comprises displaying a predetermined sequence of inquiries presented to the respondents.

19. The method of claim 16 wherein the sequence has an inquiry-to-inquiry time interval controlled by the central base station.

20. The method of claim 19 wherein the sequence has an inquiry-to-inquiry time interval controlled by the pace of the individual respondents, such that each respondent may respond to the inquiries at their own pace.

21. The method of claim 20 wherein step g) further comprises analyzing response data by respondents' classifications before the analyzed response data is displayed in real time.

22. The method of claim 15 wherein step f) further comprises monitoring compliance of respondents in entering response data into their respective response units.

23. The method of claim 22 wherein step f) still further comprises monitoring the performance of respondents in entering response data into their respective response units.

24. The method of claim 15 wherein step c) and d) further comprise collecting moment-to-moment qualitative evaluation of the display of step a) by the respondents.

25. The method of claim 24 wherein the prompting of step c) further comprises multiple choice questions and further wherein the response data of step d) comprises answers to the multiple choice questions.

26. The method of claim 25 wherein step f) further comprises monitoring compliance of respondents in entering response data into their respective response units.

27. The method of claim 26 wherein step f) still further comprises monitoring the performance of respondents in entering response data into their respective response units.

28. The method of claim 24 wherein step f) further comprises analyzing response data by bivariate analysis before the analyzed response data is displayed, where one variable is the elapsed time for the segment being tested and the other is an aggregated variable corresponding to the respondents.

29. The method of claim 15 wherein step g) further comprises displaying accumulated response data as a graphical overlay on a video image of the display of step a).

30. The method of claim 29 wherein the video image of step g) is a real-time image of the display of step a).

31. The method of claim 30 wherein the video image of step g) is a replay of a recorded image of the display of step a).

32. The method of claim 15 wherein step f) further comprises editing the accumulated response data according to a first set of decision rules that determine if one or more of the respondents were not actively participating in the session; and also applying a second set of decision rules to determine if respondents were exhibiting abnormal or extreme behavior.

33. The method of claim 15 wherein step d) further comprises the central base station polling the remote response units for response data.

34. The method of claim 33 wherein step f) further comprises echoing response data entered on a display of the respective remote unit into which that response data was entered.

35. The method of claim 15 wherein step e) further comprises manipulating the display of the remote response unit in response to the invalidity message in order to indicate to the respondent that the response data previously transmitted was invalid.

36. The method of claim 15 wherein step e) further comprises repeating the prompt that was written on the display when the invalid data was entered in response to the invalidity message.

37. The method of claim 36 wherein step f) further comprises recording an error flag as the data entry after three consecutive invalid data entries.

38. The method of claim 15 wherein step d) further comprises indicating on the display of a particular remote response unit that response data sent by the particular remote response unit has been received by the central base unit.

39. A system for real-time collection of data from a plurality of respondents comprising:
  a) a central portion having central processor means for receiving and accumulating response data; and
  b) a remote portion having a plurality of wireless response units, each having a display and each transmitting response data to the central processor means as each unit receives a message packet containing a display update instruction for controlling the display of the unit and a message address corresponding to a unit address of that unit;
wherein a plurality of individual respondents enter response data into respective individual wireless response units which data is collected and analyzed by the central processor means in real time, and wherein the central processor also checks the validity of the response data and sends an invalidity message to response units which transmit invalid response data.

40. The system of claim 39 wherein each response unit transmits response data to the central portion via a wireless radio communications link.

41. The system of claim 39 wherein each response unit transmits response data to the central portion via a wireless optical link.

42. The system of claim 41 wherein the optical link is an infrared communications link.

43. The system of claim 39 wherein each response unit transmits response data to the central portion via a wireless acoustic link.

44. The system of claim 43 wherein the acoustic link is an ultrasonic communications link.

45. The system of claim 39 wherein the central portion prompts a respondent to respond at a response unit and the system measures and stores the time taken by an individual respondent to enter response data into the respective response unit.

46. The system of claim 45 wherein the time measured and stored is per respondent and per question.

47. The system of claim 46 wherein the time measured and stored is displayed on an observation monitor.

* * * * *